US008535817B2

(12) United States Patent
Imaoka

(10) Patent No.: US 8,535,817 B2
(45) Date of Patent: Sep. 17, 2013

(54) MAGNETIC RECORDING MEDIUM AND METHOD OF MANUFACTURING THE SAME

(75) Inventor: Noriko Imaoka, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 12/869,301

(22) Filed: Aug. 26, 2010

(65) Prior Publication Data

US 2011/0052908 A1    Mar. 3, 2011

(30) Foreign Application Priority Data

Aug. 27, 2009    (JP) .................................. 2009-196322

(51) Int. Cl.
*G11B 5/708*    (2006.01)

(52) U.S. Cl.
USPC ........................................................ 428/844

(58) Field of Classification Search
None
See application file for complete search history.

(56) References Cited

U.S. PATENT DOCUMENTS

| 4,074,002 A * | 2/1978 | Hack et al. ..................... 428/331 |
| 4,803,121 A * | 2/1989 | Ryoke et al. ................... 428/329 |
| 7,635,499 B2 | 12/2009 | Naoe |
| 2005/0153062 A1 | 7/2005 | Naoe |
| 2007/0111040 A1 * | 5/2007 | Yoshimura et al. ......... 428/844.2 |

FOREIGN PATENT DOCUMENTS

| JP | 01-235028 A | 9/1989 |
| JP | 07-014159 A | 1/1995 |
| JP | 2002-288816 A | 10/2002 |
| JP | 2004-103137 A | 4/2004 |
| JP | 2005-216349 A | 8/2005 |
| JP | 2005-228369 A | 8/2005 |

OTHER PUBLICATIONS

Machine Translation of JP-2005-216349 A (patent date 2005).*
Office Action dated Sep. 18, 2012 in Japanese Application No. JP 2009-196322.
Office Action dated Apr. 16, 2013 in Japanese Application No. 2009-196322.

* cited by examiner

*Primary Examiner* — Kevin Bernatz
(74) *Attorney, Agent, or Firm* — Sughrue Mion, PLLC

(57) ABSTRACT

An aspect of the present invention relates to a magnetic recording medium comprising a nonmagnetic layer containing a nonmagnetic powder and a binder and a magnetic layer containing a ferromagnetic powder and a binder in this order on a nonmagnetic support, wherein
the magnetic layer comprises a nonmagnetic powder of which coefficient of variation CV of a particle size distribution as denoted by the following formula (1):

$$CV(\%)=\sigma/\phi\times 100 \qquad (1)$$

is less than 20 percent, and
the magnetic layer has a thickness being equal to or less than 0.1 μm and falling within a range of $1.1 \leq \phi/t \leq 8.0$, wherein σ denotes a standard deviation of a particle diameter, φ denotes an average particle diameter of the nonmagnetic powder comprised in the magnetic layer being expressed in μm, and t denotes a thickness of the magnetic layer being expressed in μm.

17 Claims, No Drawings

MAGNETIC RECORDING MEDIUM AND METHOD OF MANUFACTURING THE SAME

CROSS-REFERENCE TO RELATED APPLICATIONS

This application claims the benefit of priority under 35 USC 119 to Japanese Patent Application No. 2009-196322, filed on Aug. 27, 2009, which is expressly incorporated herein by reference in its entirety.

BACKGROUND OF THE INVENTION

1. Field of the Invention

The present invention relates to a magnetic recording medium and to a method of manufacturing the same. More particularly, the present invention relates to a magnetic recording medium having both good electromagnetic characteristics and frictional characteristics and to a method of manufacturing the same.

2. Discussion of the Background

In recent years, great advances have been made in means of rapidly transmitting information, permitting the transmission of data and images containing immense amounts of information. The increase in the quantity of information and enhancement of data transmission techniques have resulted in demand for higher density recording by the recording media used to record, reproduce, and store information.

Microparticulate magnetic materials and their high-degree dispersion in magnetic layers are widely employed to achieve high-density recording. The higher the degree to which a microparticulate magnetic material is dispersed, the fewer the protrusions produced by the magnetic material that are present on the surface of the magnetic layer and the greater the surface smoothness of the magnetic layer. However, the greater the surface smoothness of the magnetic layer, the greater the coefficient of friction as the reproduction head and medium slide against each other, resulting in a decrease in running durability.

Accordingly, the surface contour of the magnetic layer is controlled by adjusting the type and quantity of nonmagnetic filler (carbon black, abrasive, and the like) added to the magnetic layer (for example, see Japanese Unexamined Patent Publication (KOKAI) No. 2004-103137, which is expressly incorporated herein by reference in its entirety). Further, Japanese Unexamined Patent Publication (KOKAI) No. 2002-288816, which is expressly incorporated herein by reference in its entirety, proposes specifying the relation between the average particle diameter of the abrasive particles in the magnetic layer and the thickness of the magnetic layer to control the roughness of the magnetic layer surface.

Controlling the surface contours of the magnetic layer in the conventional manner is an effective means of reducing the actual contact area between the head and the medium to enhance frictional characteristics (lower the coefficient of friction) during signal reproduction. Additionally, when the surface contours of the magnetic layer are controlled to enhance frictional characteristics, electromagnetic characteristics may be compromised. This is because the decrease in the actual contact area between the head and the medium becomes a factor in the spacing of the head and the medium surface that leads to deterioration in electromagnetic characteristics.

Conventionally, there has thus been a tradeoff between frictional characteristics and electromagnetic characteristics, making it difficult to achieve both.

SUMMARY OF THE INVENTION

An aspect of the present invention provides for a magnetic recording medium affording both good electromagnetic characteristics and frictional characteristics.

The present inventor conducted extensive research into achieving the above-stated magnetic recording medium, resulting in the following discoveries.

As a means of achieving both electromagnetic characteristics and frictional characteristics, it is conceivable to control the protrusion of nonmagnetic filler from the surface of the magnetic layer by specifying the relation between the average particle diameter of the nonmagnetic filler in the magnetic layer and the thickness of the magnetic layer as described in Japanese Unexamined Patent Publication (KOKAI) No. 2002-288816. However, research conducted by the present inventor revealed that simply specifying the relation between the average particle diameter of the nonmagnetic filler in the magnetic layer and the thickness of the magnetic layer did not achieve both electromagnetic characteristics and frictional characteristics. First, this was attributed to the fact that particles that had a particle size much smaller than the average particle diameter and thus did not substantially contribute to enhancing frictional characteristics were contained in the nonmagnetic filler, making it difficult to adequately enhance frictional characteristics with the addition of just a small quantity. Second, this was attributed to the fact that when the quantity was increased to increase the number of particles contributing to enhancing frictional characteristics, the number of coarse particles that were greatly removed from the average particle diameter in the nonmagnetic filler and became a spacing factor increased, compromising electromagnetic characteristics.

Accordingly, the present inventor conducted further investigation based on this knowledge. She discovered that by using a nonmagnetic powder having a sharp particle size distribution as the nonmagnetic filler in the magnetic layer and setting the relation between the nonmagnetic powder and the thickness of the magnetic layer to within a range at which the nonmagnetic powder did not become a spacing factor and contributed to enhancing frictional characteristics, it was possible to achieve both frictional characteristics and electromagnetic characteristics. The present invention was devised on that basis.

An aspect of the present invention relates to a magnetic recording medium comprising a nonmagnetic layer containing a nonmagnetic powder and a binder and a magnetic layer containing a ferromagnetic powder and a binder in this order on a nonmagnetic support, wherein the magnetic layer comprises a nonmagnetic powder of which coefficient of variation CV of a particle size distribution as denoted by the following formula (1):

$$CV(\%) = \sigma/\phi \times 100 \qquad (1)$$

is less than 20 percent, and the magnetic layer has a thickness being equal to or less than 0.1 μm and falling within a range of $1.1 \leq \phi/t \leq 8.0$, wherein σ denotes a standard deviation of a particle diameter, φ denotes an average particle diameter of the nonmagnetic powder comprised in the magnetic layer being expressed in μm, and t denotes a thickness of the magnetic layer being expressed in μm.

The nonmagnetic powder comprised in the magnetic layer may be composed of inorganic oxide particles.

The nonmagnetic powder comprised in the magnetic layer may be composed of colloidal particles.

The nonmagnetic powder comprised in the magnetic layer may be composed of silica colloidal particles.

The average particle diameter φ of the nonmagnetic powder comprised in the magnetic layer may range from 0.10 to 0.20 μm, and the magnetic layer may comprise the nonmagnetic powder in a quantity ranging from 1.5 to 3.5 weight parts, per 100 weight parts of the ferromagnetic powder.

The magnetic layer may further comprise an inorganic powder with a Mohs' hardness of equal to or higher than 6.

The density of protrusions on the surface of the magnetic layer, as measured by an atomic force microscope, may satisfies the following equation (3):

$$\text{Density of protrusions equal to or higher than 25 nm in height/density of protrusions equal to or higher than 15 nm in height} < 0.1 \quad (3).$$

The maximum particle diameter of the nonmagnetic powder comprised in the magnetic layer may satisfy the following equation (2):

$$\text{Maximum particle diameter being expressed in } \mu m < \phi + 10\sigma \quad (2).$$

The average degree of circularity of the nonmagnetic powder comprised in the magnetic layer may be greater than 0.8 but equal to or less than 1.0.

The nonmagnetic layer may be a radiation-cured layer.

A further aspect of the present invention relates to a method of manufacturing a magnetic recording medium, wherein the magnetic recording medium is the magnetic recording medium according to claim 1, and the method comprises forming a magnetic layer with a magnetic layer coating liquid comprising a ferromagnetic powder, a binder, and a nonmagnetic powder of which coefficient of variation CV of a particle size distribution as denoted by the following formula (1) is less than 20 percent:

$$CV(\%) = \sigma/\phi \times 100 \quad (1)$$

wherein σ denotes a standard deviation of a particle diameter, and φ denotes an average particle diameter of the nonmagnetic powder comprised in the magnetic layer coating liquid being expressed in μm.

An embodiment of the above method may comprise preparing the magnetic layer coating liquid by mixing a first liquid comprising a ferromagnetic powder, a binder, and an organic solvent with a second liquid comprising the nonmagnetic powder and an organic solvent.

The second liquid may be a colloidal liquid.

The colloidal liquid may be a silica sol.

The organic solvent comprised in the first liquid may have a compatibility with the organic solvent comprised in the second liquid.

The organic solvent comprised in the first liquid and the organic solvent comprised in the second liquid may be respectively selected from the group consisting of methyl ethyl ketone, cyclohexanone, and mixed solvents thereof.

Another embodiment of the above method may comprise preparing the magnetic layer coating liquid by adding the nonmagnetic powder to a first liquid comprising a ferromagnetic powder, a binder, and an organic solvent.

The nonmagnetic powder is dispersible in the organic solvent comprised in the first liquid.

The above method may comprises:

coating a nonmagnetic layer coating liquid comprising a nonmagnetic powder and a binder on a nonmagnetic support to form a coating layer;

subjecting the coating layer to a curing treatment to form a nonmagnetic layer; and then coating the magnetic layer coating liquid on the nonmagnetic layer formed.

The binder comprised in the nonmagnetic layer coating liquid may comprise a radiation-curable resin.

The present invention can provide a magnetic recording medium that achieves both frictional characteristics and electromagnetic characteristics, thereby having both good electromagnetic characteristics and running durability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Magnetic Recording Medium

The present invention relates to a magnetic recording medium comprising a nonmagnetic layer containing a nonmagnetic powder and a binder and a magnetic layer containing a ferromagnetic powder and a binder in this order on a nonmagnetic support. The magnetic recording medium of the present invention comprises a magnetic layer that contains a nonmagnetic powder (also referred to as a "nonmagnetic filler" hereinafter) of which coefficient of variation CV of a particle size distribution as denoted by the following formula (1):

$$CV(\%) = \sigma/\phi \times 100 \quad (1)$$

is less than 20 percent, and the magnetic layer has a thickness being equal to or less than 0.1 μm and falling within a range of $1.1 \leq \phi/t \leq 8.0$.

In the above formula and equation, σ denotes a standard deviation of a particle diameter, φ denotes an average particle diameter of the nonmagnetic powder comprised in the magnetic layer being expressed in μm, and t denotes a thickness of the magnetic layer being expressed in μm.

Thickness of the Magnetic Layer

In the magnetic recording medium of the present invention, the thickness of the magnetic layer is equal to or less than 0.1 μm. When the thickness of the magnetic layer exceeds 0.1 μm, it becomes difficult to achieve good electromagnetic characteristics in the high density recording range. The thickness of the magnetic layer is desirably optimized within the range of equal to or less than 0.1 μm based on the saturation magnetization level and head gap length of the magnetic head employed and on the recording signal band. For high-density recording, the thickness of the magnetic layer is desirably 0.01 to 0.1 μm, preferably 0.02 to 0.09 μm. A single magnetic layer will suffice, but the magnetic layer can be separated into two or more layers having different magnetic characteristics, and known multiple magnetic layer configurations can be employed.

Nonmagnetic Powder (Nonmagnetic Filler)

To contribute to enhancing frictional characteristics by suitably protruding from the surface of the magnetic layer, the nonmagnetic filler that is employed in the magnetic layer is one such that, when the average particle diameter is denoted as φ (μm), the relational equation with the thickness of the magnet layer t (μm), denoted as φ/t, is equal to or greater than 1.1. When φ/t is less than 1.1, the nonmagnetic filler does not adequately protrude from the surface of the magnetic layer, thereby causing the frictional coefficient to increase as the head slides against the surface of the magnetic layer and making it impossible to obtain good running durability. Additionally, when φ/t exceeds 8.0, the amount of protrusion of the nonmagnetic filler from the surface of the magnetic layer becomes excessive and becomes a spacing factor, causing electromagnetic characteristics to deteriorate. Accordingly, in the present invention, to achieve both electromagnetic characteristics and running durability, a nonmagnetic powder in which φ/t is $1.1 \leq \phi/t \leq 8.0$ is employed as the nonmagnetic filler. To achieve better electromagnetic characteristics and running durability, $1.5 \leq \phi/t \leq 8.0$ is desirable and $2.0 \leq \phi/t \leq 6.0$ is preferable. The thickness of the various layers of the magnetic recording medium of the present invention, including the magnetic layer, can be calculated from the coating conditions (the quantity of coating liquid coated, the area coated, and the like). It can also be determined by observing an ultrathin slice (10 μm in length, for example) of the magnetic recording medium with a transmission electron microscope (TEM) at a magnification of 500,000-fold, for example.

However, as set forth above, simply specifying the relation between the average particle diameter of the nonmagnetic filler and the thickness of the magnetic layer makes it impossible to attain good electromagnetic characteristics because the effects of coarse particles considerably removed from the average particle diameter result in pronounced spacing loss. Accordingly, in the present invention, a nonmagnetic powder in which the coefficient of variation CV of the particle size distribution as denoted by formula (1) is less than 20 percent is employed as the nonmagnetic filler:

$$CV(\%) = \sigma/\phi \times 100 \tag{1}$$

(wherein σ: standard deviation of the particle diameter and φ: average particle diameter (μm)).

In a nonmagnetic powder in which the value of CV exceeds 20 percent, it is difficult to attain good electromagnetic characteristics even when improvement is achieved in frictional characteristics because numerous coarse particles considerably removed from the average particle diameter are contained. Further, the more the CV value exceeds 30 percent, for example, the fewer particles there are that effectively improve frictional characteristics, making it difficult to attain both frictional characteristics and electromagnetic characteristics. To achieve better frictional characteristics and electromagnetic characteristics, the CV value is desirably equal to or less than 15 percent, preferably equal to or less than 10 percent, and more preferably, equal to or less than 7 percent. The lower the CV value, the sharper the particle size distribution, which is desirable. However, taking into account the particle size distribution of the particles that are available in practical terms, the lower limit is about 3.0 percent, for example.

In the present invention, the average particle diameter of the nonmagnetic filler is a value that is measured by the method set forth below. The CV value is a value that can be obtained from the average particle diameter and the standard deviation of the particle diameter of 50 particles measured by the method set forth below.

Photographs of the particles of a nonmagnetic powder are printed on photographic paper with a transmission electron microscope. For example, a model H-9000 transmission electron microscope made by Hitachi can be used to photograph particles at a magnification of about 50,000-fold to about 100,000-fold and print the photograph on photographic paper to obtain a particle photograph.

Next, 50 particles are randomly extracted from the particle photograph, the contour of each particle is traced with a digitizer, and the diameter of a circle of identical area (the diameter corresponding to a circular area) to the traced region is calculated. In the present invention, the term "particle diameter of the nonmagnetic filler" refers to the diameter thus calculated. The image analysis software KS-400 made by Carl Zeiss can be employed to calculate particle diameters, for example. Further, a circle with a diameter of 1 cm, for example, can be used in scale correction in the course of incorporating images from the scanner and analyzing them.

The arithmetic average of the diameters of the 50 particles measured by the above method is adopted as the average particle diameter of the nonmagnetic powder.

The average particle diameter that is obtained by the above method is an average value that is calculated from 50 primary particles. The term "primary particle" means an independent, non-aggregated particle. Accordingly, the sample particles that are used to measure the average particle diameter of the nonmagnetic powder can be sample powder collected from the magnetic layer or starting material powder so long as the diameter of the primary particles can be measured. Sample powder can be collected from the magnetic layer by the following method, for example.

Method of Collecting Sample Powder

1. Treating the surface of the magnetic layer for 1 to 2 minutes with a plasma reactor made by Yamato Scientific Co., Ltd. and ashing and removing the organic components (binder component and the like) of the surface of the magnetic layer.

2. Adhering filter paper that has been immersed in an organic solvent such as cyclohexanone or acetone to the edge of a metal rod, rubbing the surface of the magnetic layer following the treatment of 1. above against it, and transferring by peeling the magnetic layer component from the magnetic recording medium to the paper.

3. Shaking the component that has peeled off in 2. above into a solvent such as cyclohexanone or acetone (placing each piece of filter paper in solvent and shaking it with an ultrasonic disperser), drying the solvent, and collecting the component that has peeled off.

4. Placing the component that has been scraped off in 3. above in a glass test tube that has been thoroughly washed, adding about 20 mL of n-butylamine to the magnetic layer component, and sealing the glass test tube (the n-butylamine is added in a quantity that is capable of breaking down the remaining binder that has not been ashed).

5. Heating the glass test tube at 170° C. for equal to or more than 20 hours to break down the binder and curing agent components.

6. Thoroughly washing with pure water and drying the precipitate following the decomposition of 5. above and collecting the powder.

Sample powder can be collected from the magnetic layer by the above steps.

The nonmagnetic filler can be any nonmagnetic powder, in the form of either an organic or inorganic substance, in which the average particle diameter $\phi$ satisfies the above relation of $\phi/t$ and in which the CV value is less than 20 percent. The average particle diameter $\phi$ need only satisfy $1.1 \leq \phi/t \leq 8.0$, but 0.10 to 0.20 μm is desirable to further enhance electromagnetic characteristics.

The presence of coarse particles that become spacing factors and are considerably removed from the average particle diameter in the nonmagnetic filler that is contained in the magnetic layer is undesirable from the perspective of enhancing electromagnetic characteristics, as described above. Thus, the maximum particle diameter of the nonmagnetic filler in the magnetic layer is desirably not far removed from the average particle diameter. Specifically, the maximum particle diameter among the particle diameters of the 50 particles measured by the above-described method desirably satisfies equation (2) below, that is, is smaller than the average particle diameter $\phi + 10\sigma$.

$$\text{Maximum particle diameter (μm)} < \phi + 10\sigma \qquad (2)$$

The content of the nonmagnetic powder in the magnetic layer is not specifically limited, and can be set within a range over which both electromagnetic characteristics and frictional characteristics are achieved. It is desirably 1.0 to 4.0 weight parts, preferably 1.5 to 3.5 weight parts, per 100 weight parts of ferromagnetic powder. In particular, nonmagnetic powder having an average particle diameter of 0.10 to 0.20 μm is desirably added to the magnetic layer in a range of 1.5 to 3.5 weight parts per 100 weight parts of ferromagnetic powder.

As set forth above, the nonmagnetic filler can be in the form of either an organic or inorganic substance. In terms of the availability of monodisperse particles, it is desirable comprised of particles of an inorganic substance. Examples of such inorganic substances are: metal oxides, metal carbonates, metal sulfates, metal nitrides, metal carbides, and metal sulfides. Inorganic oxides are desirable. α-alumina with α-conversion rate of equal to or greater than 90 percent, β-alumina, γ-alumina, θ-alumina, silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide may be employed as inorganic oxides, either singly or in combinations of two or more. From the perspective of availability of monodisperse particles, silica (silicon dioxide) powder is desirable as an inorganic oxide powder.

When the protrusions on the surface of the magnetic layer are of low sphericity, there is pronounced abrasion of the particles due to sliding against the head and it is sometimes difficult for the nonmagnetic particles to maintain their enhancing effect on frictional characteristics for an extended period. Further, particles with anisotropic shapes may form high protrusions and sometimes becomes a spacing factor. From these perspectives, the use of a nonmagnetic powder that is highly spherical is desirable, and the presence of a highly spherical nonmagnetic powder in the magnetic layer in the form of primary particles is preferred.

The degree of circularity can be obtained from the following equation as an index of sphericity.

$$\text{Degree of circularity} = 4(\pi \times S)L^2$$

In the above equation, S denotes the area (unit: μm²) of the region when the contour of an individual particle is traced with a digitizer in a particle photograph obtained by the above-described method, and L denotes the length of circumference (unit: μm) of the region that is traced. In the present invention, it is desirable to employ a nonmagnetic powder in which the sphericity indicated by the average degree of circularity (the arithmetic average of the degree of circularity) that is measured for 50 particles randomly extracted from the particle photograph exceeds 0.80 but does not exceed 1.0. When a given particle is spherical (the particle is circular in the photograph), the degree of circularity becomes 1.0.

In the present invention, a nonmagnetic powder with a sharp particle size distribution is employed as the filler in the magnetic layer. To further enhance the effect achieved by using a nonmagnetic powder having a sharp particle size distribution, it is desirable to inhibit aggregation of, and to achieve high dispersion of, the nonmagnetic powder in the magnetic layer. It is preferable for the nonmagnetic powder to be present in the magnetic layer in the form of primary particles. Also, when employing a nonmagnetic powder of high sphericity as set forth above, it is desirable for the nonmagnetic powder to be present in the magnetic layer in the form of primary particles. Thus, it is possible to utilize (1) the method of employing colloidal particles as the nonmagnetic filler, and (2) the method of employing a nonmagnetic powder that is dispersible in the organic solvent that is employed in the coating liquid for forming the magnetic layer.

Methods (1) and (2) above will be described below.

<Method (1)>

Colloidal particles can be present in a state of stable dispersion in a dispersion medium. Thus, the use of a colloidal liquid when preparing a coating liquid for forming the magnetic layer permits the dispersion to a high degree of colloidal particles in the coating liquid for forming the magnetic layer. Accordingly, by using a coating liquid for forming the magnetic layer that has been prepared in this manner to form the magnetic layer, it is possible to disperse the nonmagnetic filler (colloidal particles) to a high degree and, desirably, obtain a magnetic layer in which nonmagnetic filler is present in the form of primary particles.

From the perspective of availability, inorganic colloidal particles are desirable and inorganic oxide colloidal particles are preferred. Colloidal particles of the above-listed inorganic oxides are examples of the inorganic oxide colloidal particles. These include complex inorganic oxide colloidal particles in the form of $SiO_2 \cdot Al_2O_3$, $SiO_2 \cdot B_2O_3$, $TiO_2 \cdot CeO_2$, $SnO_2 \cdot Sb_2O_3$, $SiO_2 \cdot Al_2O_3 \cdot TiO_2$, and $TiO_2 \cdot CeO_2 : SiO_2$. Desirable examples are inorganic oxide colloidal particles such as $SiO_2$, $Al_2O_3$, $TiO_2$, $ZrO_2$, and $Fe_2O_3$. From the perspective of the availability of monodisperse colloidal particles, silica colloidal particles (colloidal silica) is preferred.

Since colloidal particles generally have hydrophilic surfaces, they are suited to the preparation of colloidal liquids employing water as the dispersion medium. For example, colloidal silica obtained by the usual synthesis methods has a surface that is covered with polarized oxygen atoms ($O^{2-}$), and will thus adsorb to water when in water, forming hydroxyl groups and stabilizing. However, these particles tend not to remain in the form of a colloid when placed in an organic solvent employed in the coating liquid of a magnetic recording medium. Accordingly, the surface of the particles is treated to render it hydrophobic to permit dispersion of these particles in the form of a colloid in organic solvents. Such colloidal particles that have been treated to render them hydrophobic are desirably employed in the present invention, as well. The details of such hydrophobic treatments are given in, for example, Japanese Unexamined Patent Publication (KOKAI) Heisei Nos. 5-269365 and 5-287213, and Japanese Unexamined Patent Publication (KOKAI) No. 2007-63117, which are expressly incorporated herein by reference in their entirety. Colloidal particles that have been subjected to such a surface treatment can be synthesized by the methods described in the above-cited publications and the like, or procured as commercial products.

An example of a method of preparing the coating liquid for forming the magnetic layer using the above colloidal particles is mixing a first liquid (magnetic liquid) containing a ferromagnetic powder, a binder and an organic solvent with a second liquid (colloidal liquid) containing colloidal particles. As will be set forth further below, when adding an abrasive to the magnetic layer, the abrasive can be added to at least either the first or second liquid. It is also possible to separately prepare a liquid (abrasive liquid) containing the abrasive and an organic solvent and mix the abrasive liquid with the first and second liquids.

Any proportion of acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methylcyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethyl formamide; and hexane can be employed as the organic solvent employed to prepare the coating liquid for forming the magnetic layer. The organic solvent does not necessarily have to be 100 percent pure. It may contain isomers, unreacted matter, by-products, decomposition products, oxides, moisture, and other impurities. The impurities desirably constitute equal to or less than 30 weight percent, preferably equal to or less than 10 weight percent. To enhance dispersibility, a somewhat high degree of polarity is desirable. Within the solvent composition, a solvent with a dielectric constant of equal to or greater than 15 desirably constitutes for equal to or more than 50 weight percent. Further, a dissolution parameter of 8 to 11 is desirable. From these perspectives, examples of desirable organic solvents are methyl ethyl ketone, cyclohexanone, and mixed solvents thereof in any ratio.

The organic solvent employed in the magnetic liquid and the organic solvent employed in the colloidal liquid can be selected as desired from the above-listed organic solvents. To maintain a stable colloidal state when mixing the magnetic liquid and the colloidal liquid, it is desirable for the organic solvent contained in the magnetic liquid to be compatible with the organic solvent contained in the colloidal liquid. The compatibility referred to in the present invention means that two solvents can be uniformly mixed to a degree where they do not appear to separate into two or more liquids when visually observed. From this perspective, the solvent employed in the magnetic liquid and the solvent employed in the colloidal liquid are desirably selected from among methyl ethyl ketone, cyclohexanone, and mixed solvents thereof, which were given above as examples of desirable organic solvents. In that case, the solvent of the abrasive liquid is also desirably selected from among methyl ethyl ketone, cyclohexanone, and mixed solvents thereof. The concentration of the colloidal particles in the colloidal liquid is, for example, about 5 to 50 weight percent. However, it is not specifically limited so long as it allows the nonmagnetic particles to remain stably present in colloidal form.

<Method (2)>

Method (1) above is employed to prepare a coating liquid for forming the magnetic layer using a liquid of a nonmagnetic filler. However, the present invention is not limited to method (1). A nonmagnetic powder can be provided as the powder when preparing a coating liquid for forming the magnetic layer. In that case, a nonmagnetic powder that is dispersible in the organic solvent that is employed to prepare the coating liquid for forming the magnetic layer is desirably employed as the nonmagnetic powder. In the present invention, the term "dispersible" means a state that does not produce aggregation or precipitation in the solvent. The fact that a nonmagnetic powder is dispersible in the above organic solvent can be confirmed by the fact that no coarse aggregate or precipitate is observed visually when the nonmagnetic powder is added to and dispersed in the organic solvent. Examples of such nonmagnetic powders that are dispersible in organic solvents are nonmagnetic powders that have been surface-treated to enhance affinity for the organic solvent, such as are described in Japanese Unexamined Patent Publication (KOKAI) Nos. 2008-137854 and 2008-247731 and Japanese Examined Patent Publication (KOKOKU) Heisei No. 2-1089; and nonmagnetic powders containing additives to enhance dispersibility such as are described in Japanese Unexamined Patent Publication (KOKAI) No. 2004-359476. The contents of the above publications are expressly incorporated herein by reference in their entirety.

The nonmagnetic powders that are dispersible in organic solvents as set forth above can be obtained by known methods by referring to the methods described in the above-cited publications and the like, or can be obtained as commercial products.

The magnetic recording medium of the present invention will be described in greater detail below.

Magnetic Layer (i) Ferromagnetic Powder

Hexagonal ferrite powders and ferromagnetic metal powders are examples of the ferromagnetic powder contained in the magnetic layer.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the ferromagnetic powder described further below (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter). In the measurement of powder size, the standard deviation/average value, expressed as a percentage, is defined as the coefficient of variation.

Examples of hexagonal ferrite powders are barium ferrite, strontium ferrite, lead ferrite, calcium ferrite, and various substitution products thereof such as Co substitution products. The average plate diameter of the hexagonal ferrite powder preferably ranges from 10 to 100 nm, more preferably 10 to 60 nm, further preferably 10 to 50 nm. Particularly when employing an MR head in reproduction to increase a track density, an average plate diameter equal to or less than 60 nm is desirable to reduce noise, with equal to or less than 50 nm being preferred. An average plate diameter equal to or higher than 10 nm can yield stable magnetization without the effects of thermal fluctuation. An average plate diameter equal to or less than 100 nm can permit low noise and is suited to the high-density magnetic recording. The hexagonal ferrite powder employed in the present invention preferably has a coercivity (Hc) ranging from 2,000 to 4,000 Oe (about 160 to 320 kA/m). For details of the hexagonal ferrite powder suitable for use in the present invention, reference can be made to paragraphs [0034] to [0037] of Japanese Unexamined Patent Publication (KOKAI) No. 2009-54270, which is expressly incorporated herein by reference in its entirety.

The ferromagnetic metal powder employed in the magnetic layer is not specifically limited, but preferably a ferromagnetic metal powder comprised primarily of $\alpha$-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, incorporation of at least one of the following in addition to $\alpha$-Fe is desirable: Al, Si, Ca, Y, Ba, La, Nd, Co, Ni, and B. Incorporation of at least one selected from the group consisting of Co, Y and Al is particularly preferred. The specific surface area by BET method of the ferromagnetic metal powder employed in the magnetic layer is preferably 45 to 100 $m^2$/g, more preferably 50 to 80 $m^2$/g. At 45 $m^2$/g and above, low noise can be achieved. At 100 $m^2$/g and below, good surface properties can be achieved. The average major axis length of the ferromagnetic metal powder is preferably equal to or greater than 10 nm and equal to or less than 150 nm, more preferably equal to or greater than 20 nm and equal to or less than 150 nm, and still more preferably, equal to or greater than 30 nm and equal to or less than 120 nm. The average acicular ratio of the ferromagnetic metal powder is preferably equal to or greater than 3 and equal to or less than 15. The $\sigma_s$ of the ferromagnetic metal powder is preferably 100 to 180 A·$m^2$/kg, more preferably 110 to 170 A·$m^2$/kg. The coercivity of the ferromagnetic metal powder is preferably 2,000 to 3,500 Oe (about 160 to 280 kA/m), more preferably 2,200 to 3,000 Oe (about 176 to 240 kA/m). For details of the ferromagnetic metal powder suitable for use in the present invention, reference can be made to paragraphs [0038] to [003417] of Japanese Unexamined Patent Publication (KOKAI) No. 2009-54270, which is expressly incorporated herein by reference in its entirety.

(ii) Additives

Additives can be added as needed to the magnetic layer and nonmagnetic layer, described further below. Examples of these additives are abrasives, lubricants, dispersants, dispersion adjuvants, antimildew agents, antistatic agents, oxidation inhibitors, and solvents. For specific details on these additives, reference can be made to paragraphs [0043], [0049], and [0050] of Japanese Unexamined Patent Publication (KOKAI) No. 2009-54270, which is expressly incorporated herein by reference in its entirety. The types and quantities of the additives employed in the present invention can be varied as needed between the magnetic layer and the nonmagnetic layer, described further below. All or part of the additives employed in the present invention can be added in any step during the manufacturing of the coating liquid for the magnetic layer or nonmagnetic layer. For example, there are cases in which the additives are mixed with the ferromagnetic powder prior to the kneading step; cases in which they are added in the step of kneading the ferromagnetic powder, binder, and solvent; cases in which they are added during the dispersing step; cases when they are added following dispersion; and cases where they are added immediately prior to coating.

Of these, it is desirable for the magnetic layer in the present invention to contain an additive in the form of an inorganic powder with a Mohs' hardness of equal to or higher than 6. As set forth above, it is desirable to employ an inorganic powder of high sphericity as a nonmagnetic filler. However, this alone sometimes does not ensure adequate abrasiveness of the magnetic layer, may result in inadequate elimination of material adhering to the head, and may cause running durability to decrease. Accordingly, in such cases, it is desirable to further employ a highly abrasive inorganic powder having a Mohs' hardness of equal to or higher than 6, as set forth above. From the perspective of abrasiveness, an inorganic powder with a Mohs' hardness of equal to or higher than 9 is preferred. Examples of such inorganic powders are the various inorganic powders that are commonly employed as abrasives. Specific examples are alumina ($Al_2O_3$), silicon carbide, boron carbide ($B_4C$), TiC, chromium oxide ($Cr_2O_3$), cerium oxide, zirconium oxide ($ZrO_2$), iron oxide, and diamond powder. Of these, alumina and silicon carbide are desirable. These inorganic powders may be of any shape, such as acicular, spherical, or cubic. However, inorganic powders having some angular portion are desirable due to their high abrasiveness. It is conceivable to form protrusions on the magnetic layer surface with abrasives employed as such inorganic powders to enhance frictional characteristics, but the abrasiveness increases excessively and head damage becomes pronounced when protrusions are formed on the surface of the magnetic layer with a quantity capable of maintaining frictional characteristics through protrusions formed by abrasive alone. Additionally, it is difficult to maintain frictional characteristics by forming protrusions with abrasive within a range that does not greatly damage the head. Accordingly, the conventional technique has been to employ carbon black as a nonmagnetic filler along with the abrasive and maintain frictional characteristics with protrusions of carbon black (for example, reference can be made to Japanese Unexamined Patent Publication (KOKAI) No. 2009-54270). However, based on research conducted by the present inventor, the phenomenon of a drop in electromagnetic characteristics is observed in magnetic recording media containing carbon black as filler in the magnetic layer. This is attributed to the fact that carbon black normally has a large particle size distribution, and when protrusions are formed that effectively enhance frictional characteristics, the effect of coarse particles that are considerably removed from the average particle diameter increases the spacing between the head and the surface of the recording medium. By contrast, in the present invention, both electromagnetic characteristics and frictional characteristics can be attained by employing a nonmagnetic filler having a particle size distribution (CV value) and a ratio of the average particle diameter to the thickness of the magnetic layer, $\phi/t$, that fall within the above-stated ranges.

From these perspectives, the magnetic recording medium of the present invention desirably contains no carbon black in the magnetic layer.

Regardless of the presence or absence of the above abrasive component, it is desirable to eliminate or reduce coarse protrusions that become a spacing factor on the surface of the magnetic layer. Specifically, the density of protrusions on the surface of the magnetic layer, as measured by an atomic force microscope, desirably satisfies equation (3).

Density of protrusions equal to or higher than 25 nm in height/density of protrusions equal to or higher than 15 nm in height<0.1    (3)

The ratio denoted by equation (3) is desirably less than 0.1, as stated above, and preferably equal to or less than 0.09. The absence of protrusions equal to or higher than 25 nm in height on the surface of the magnetic layer, that is, a ratio denoted by equation (3) that is equal to 0, is optimal.

The surface protrusions are measured by an atomic force microscope (AFM) in the present invention over an area 40 micrometers square (40 μm×40 μm). A triangular-based pyramidal probe with a tip radius of curvature (nominal value) of less than 100 nm that has been prepared by processing a single crystal of Si is used to determine the height of the protrusions above a reference plane (0 nm in height) in the form of the plane at which the volume of protrusions is equal to the volume of indentations over an area 30 micrometers square within the 40 micrometers square of the surface of the magnetic layer excluding marking portions used for positioning.

A desirable method of reducing the coarse protrusions to satisfy equation (3) is to disperse nonmagnetic filler to a high degree into the magnetic layer, preferably so that it is present in the form of primary particles. The coarse protrusions on the surface of the magnetic layer can be reduced by means of the dispersing conditions of the magnetic layer coating liquid, the particle diameter and quantity added when an abrasive component is added, the calendering treatment conditions, and the like. For example, the average particle diameter of the abrasive is desirably 10 to 300 nm, preferably 30 to 250 nm, and more preferably, 50 to 200 nm. The quantity added is desirably 1 to 20 weight parts, preferably 3 to 15 weight parts, and more preferably, 4 to 10 weight parts per 100 weight parts of ferromagnetic powder.

The dispersing conditions of the magnetic layer coating liquid are as follows. The dispersion retention time, while depending on the peripheral speed of the tip of the dispersing apparatus and the fill rate of the dispersion medium, is, for example, 0.2 to 10 hours, desirably 0.3 to 7 hours, and more preferably, 0.4 to 5 hours. The tip peripheral speed of the dispersing apparatus is desirably 5 to 20 m/s, preferably 7 to 15 m/s. The dispersion medium is desirably in the form of zirconia beads. The particle diameter of the dispersion medium is desirably 0.1 to 1 mm, preferably 0.1 to 0.5 mm. The fill rate of the dispersion medium can be 30 to 80 percent, desirably 50 to 80 percent.

Examples of calender processing conditions are: the type and number of stages of calender rolls, the calender pressure, the calender temperature, and the calendering rate. The greater the intensity of calendering, the greater the reduction in the number of protrusions equal to or higher than 25 nm in height tends to be. The calender pressure is, for example, 200 to 500 kN/m, desirably 250 to 350 kN/m. The calender temperature is, for example, 70 to 120° C., desirably 80 to 100° C. The calendering rate is, for example, 50 to 300 m/min, desirably 100 to 200 m/min. The harder the outer surface of the calender rolls employed, and the greater the number of stages, the more the surface of the magnetic layer tends to smoothen. Thus, the number of protrusions can be adjusted by means of the combination and number of stages of calender rolls.

(iii) Binder

Conventionally known thermoplastic resins, thermosetting resins, reactive resins, and mixtures of the same can be employed as the binder suitable for use in the magnetic layer and the nonmagnetic layer, described further below. Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane curable resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten, which is expressly incorporated herein by reference in its entirety. For the details of the binder, reference can also be made to paragraphs [0044] to [0049] of Japanese Unexamined Patent Publication (KOKAI) No. 2009-54270, which is expressly incorporated herein by reference in its entirety. The quantity of binder added to the magnetic layer preferably ranges from 5 to 30 weight percent, relative to the ferromagnetic powder. The quantity of binder added to the nonmagnetic layer preferably ranges from 10 to 20 weight percent, relative to the nonmagnetic powder.

A known radiation-curable resin can be employed as the binder. Examples of radiation-curable resins are the resins disclosed by way of example above to which radiation-curable functional groups are added. The radiation-curable functional group is not specifically limited other than that it be capable of undergoing a curing reaction (crosslinking reaction) when irradiated with radiation. From the perspective of reactivity, a radical polymerizable carbon-carbon double bond group is desirable, and an acrylic double bond group is preferred. In the present invention, the term "acrylic double bond group" refers to a residue of acrylic acid, acrylic acid ester, amide acrylate, methacrylic acid, methacrylic acid ester, amide methacrylate, or the like. Of these, (meth)acryloyl groups and (meth)acryloyloxy groups are desirable from the perspective of reactivity. In the present invention, the term "(meth)acryloyl" includes both methacryloyl and acryloyl. The various radiation-curable resins described in paragraphs [0037] to [0044] in Japanese Unexamined Patent Publication (KOKAI) No. 2002-117520, which is expressly incorporated herein by reference in its entirety, for example, can be employed as resins having radiation-curable functional groups.

When a radiation-curable resin is employed as the binder, a radiation curing treatment can be conducted following the step of coating the coating liquid. Thus, the radiation-curable functional groups contained in the radiation-curable resin undergo a curing reaction, forming a radiation-cured layer. Reference can be made to paragraphs [0068] to [0071] of above-cited Japanese Unexamined Patent Publication (KOKAI) No. 2002-117520, which is expressly incorporated herein by reference in its entirety, for the radiation curing conditions. When employing a radiation-curable resin as the binder in the nonmagnetic layer, it is desirable for the nonmagnetic layer coating liquid to be coated and dried, for radiation to be irradiated to cure the coating layer and form a radiation-cured layer (nonmagnetic layer), and then for the magnetic layer coating liquid to be coated thereover.

Additionally, when employing a thermosetting resin in the nonmagnetic layer, simultaneous multilayer coating (wet-on-wet) can be conducted in which the magnetic layer coating liquid is coated while the nonmagnetic layer coating liquid is still wet, or sequential multilayer coating (wet-on-dry) can be conducted in which the magnetic layer coating liquid is coated after the nonmagnetic layer coating liquid has dried. Reference can be made to paragraph [0077] of Japanese Unexamined Patent Publication (KOKAI) No. 2009-54270, which is expressly incorporated herein by reference in its entirety, for details on these coating methods. To form a suitable quantity of protrusions that effectively enhance frictional characteristics on the surface of the magnetic layer, the amounts of nonmagnetic filler and abrasive component in the magnetic layer that sink into the nonmagnetic layer are desirably small. From this perspective, the above sequential multilayer coating is desirably conducted. Further, coating and drying the nonmagnetic layer coating liquid, conducting a thermosetting treatment, and then forming the magnetic layer are desirable in that they further reduce sinkage into the nonmagnetic layer. Subjecting the coating layer containing a radiation-curable resin to a radiation-curing treatment to form a radiation-cured layer (nonmagnetic layer) and then forming the magnetic layer thereover is similarly effective at reducing sinkage into the nonmagnetic layer.

In sequential multilayer coating of the lower nonmagnetic layer coating liquid and the upper nonmagnetic layer coating liquid, when the nonmagnetic layer is in an uncured state, the nonmagnetic layer sometimes partially dissolves into the solvent contained in the magnetic layer coating liquid, causing interface variation or waviness between the nonmagnetic layer and magnetic layer. By coating the magnetic layer coating liquid after the nonmagnetic layer has been cured, it is possible to inhibit or reduce dissolution into the solvent contained in the magnetic layer coating liquid. Accordingly, when sequentially multilayer coating a lower nonmagnetic layer coating liquid and an upper magnetic layer coating liquid, it is desirable to conduct a curing treatment before coating the upper layer magnetic layer coating liquid, and to then form the magnetic layer over the cured layer (nonmagnetic layer). From the perspective of productivity, the curing treatment is desirably irradiation with radiation permitting the rapid formation of a cured layer.

Nonmagnetic Layer

The magnetic recording medium of the present invention comprises a nonmagnetic layer containing a nonmagnetic powder and a binder between the nonmagnetic support and the magnetic layer. The nonmagnetic powder comprised in the nonmagnetic layer can be selected from inorganic compounds such as metal oxides, metal carbonates, metal sulfates, metal nitrides, metal carbides, metal sulfides and the like. Examples of inorganic compounds are α-alumina having an α-conversion rate of 90 to 100 percent, β-alumina, γ-alumina, θ-alumina silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide; these may be employed singly or in combination. Particularly desirable are titanium dioxide, zinc oxide, iron oxide and barium sulfate due to their narrow particle distribution and numerous means of imparting functions. Even more preferred is titanium dioxide and α-iron oxide. The average particle diameter of these nonmagnetic powders preferably ranges from 0.005 to 2 µm, but nonmagnetic powders of differing particle size may be combined as needed, or the particle diameter distribution of a single nonmagnetic powder may be broadened to achieve the same effect. The specific surface area of the nonmagnetic powder preferably ranges from 1 to 100 $m^2/g$, more preferably from 5 to 80 $m^2/g$, further preferably from 10 to 70 $m^2/g$. for the nonmagnetic powder suitable for use in the nonmagnetic layer, reference can be made to paragraphs [0051] to [0053] of Japanese Unexamined Patent Publication (KOKAI) No. 2009-54270, which is expressly incorporated herein by reference in its entirety.

The various additives that can be employed in the magnetic layer can be employed in the nonmagnetic layer. The details are as set forth above. In the nonmagnetic layer, carbon black can be admixed along with nonmagnetic powder to lower the surface electric resistance, reduce light transmittance, and achieve a desired micro-Vickers hardness. The micro-Vickers hardness of the nonmagnetic layer is normally 25 to 60 $kg/mm^2$, and desirably 30 to 50 $kg/mm^2$ to allow adjustment for each head. It can be measured with a thin-film hardness meter (HMA-400 made by NEC) having a diamond triangular-based pyramid with a tip diameter of 0.1 µm and an edge angle of 80 degrees as the indenter tip. The light transmittance is generally absorption of infrared light at a wavelength of about 900 nm of equal to or less than 3 percent. For example, for VHS magnetic tape, it has been standardized at equal to or less than 0.8 percent. Thus, furnace black for rubber, thermal for rubber, black for coloring and acetylene black, and the like can be employed.

A specific surface area of 100 to 500 m$^2$/g, preferably 150 to 400 m$^2$/g, a DBP oil absorption capacity of 20 to 400 ml/100 g, preferably 30 to 200 ml/100 g, and an average particle size of 5 to 80 nm, preferably 10 to 50 nm, more preferably 10 to 40 nm are respectively desirable. A pH of 2 to 10, a moisture content of 0.1 to 10 percent, and a tap density of 0.1 to 1 g/ml are respectively desirable. For example, *Carbon Black Handbook* compiled by the Carbon Black Association, which is expressly incorporated herein by reference in its entirety, may be consulted for types of carbon black suitable for use in the nonmagnetic layer. Carbon black is available as commercial products.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827, which are expressly incorporated herein by reference in their entirety, may be employed.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The surface roughness of the nonmagnetic support employed in the present invention preferably ranges from 3 to 10 nm, as a center average roughness Ra at a cutoff value of 0.25 mm.

Backcoat Layer

Generally, more stringent repeat running properties are called for in magnetic tapes for use in recording computer data than in audio and video tapes. To maintain such high storage stability, a backcoat layer can be provided on the opposite surface of the nonmagnetic support from the surface on which the magnetic layer is provided. The backcoat layer coating liquid can be formed by dispersing particulate components such as abrasive and antistatic agents along with binder in an organic solvent. Various inorganic pigments and carbon black can be employed as particulate components. Examples of binders that can be employed, either singly or in combination, are nitrocellulose, phenoxy resin, vinyl chloride resin, and polyurethane.

Layer Structure

In the magnetic recording medium of the present invention, the thickness of the nonmagnetic support desirably ranges from 3 to 80 μm. The thickness of the above backcoat layer is, for example, 0.1 to 1.0 μm, and desirably 0.2 to 0.8 μm.

The thickness of the magnetic layer in the present invention is as set forth above. The thickness of the nonmagnetic layer is desirably 0.2 to 3.0 μm, preferably 0.3 to 2.5 μm, and further preferably, 0.4 to 2.0 μm. The nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT (100 G), or a coercivity of equal to or less than 7.96 kA/m (100 Oe), it being preferable not to have a residual magnetic flux density or coercivity at all.

Manufacturing Method

The steps for manufacturing coating liquids for forming the various layers such as the magnetic layer and the nonmagnetic layer desirably include at least a kneading step, dispersing step, and mixing steps provided as needed before and after these steps. Each of these steps may be divided into two or more stages. All of the starting materials such as the ferromagnetic powder, nonmagnetic powder, binder, carbon black, abrasives, antistatic agents, lubricants, solvents and the like that are employed in the present invention can be added at the beginning or part way through any of the steps. Individual starting materials can be divided into smaller quantities and added in two or more increments. For example, the polyurethane can be divided into small quantities and incorporated during the kneading step, dispersing step, and after the dispersing step to adjust the viscosity.

To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for magnetic and nonmagnetic layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

Details of coating and curing regarding coating liquids for magnetic and nonmagnetic layers are as set forth above. The coating machine used to apply the above coating liquids can be an air doctor coater, blade coater, rod coater, extrusion coater, air knife coater, squeeze coater, dip coater, reverse roll coater, transfer roll coater, gravure coater, kiss coater, cast coater, spray coater, spin coater or the like. Reference can be made to the "Most Recent Coating Techniques" (May 31, 1983) released by the Sogo Gijutsu Center (Ltd.), which are expressly incorporated herein by reference in their entirety, for these coating machines. Following the coating step, the medium can be subjected to various post-processing, such as processing to orient the magnetic layer, processing to smoothen the surface (calendering), and thermoprocessing to reduce heat contraction. The calendering processing is as described above. Other post-processing can be conducted by the known method. The magnetic recording medium that is obtained can be cut to prescribed size with a cutter, puncher, or the like for use.

Physical Characteristics

The saturation magnetic flux density of the magnetic layer preferably ranges from 100 to 300 mT (1,000 to 3,000 G). The coercivity (Hr) of the magnetic layer is preferably 143.3 to 318.4 kA/m (1,800 to 4,000 Oe), more preferably 159.2 to 278.6 kA/m (2,000 to 3,500 Oe). Narrower coercivity distribution is preferable. The SFD and SFDr are preferably equal to or lower than 0.6, more preferably equal to or lower than 0.2.

The coefficient of friction of the magnetic recording medium of the present invention relative to the head is desirably equal to or less than 0.5 and preferably equal to or less than 0.3 at temperatures ranging from −10° C. to 40° C. and humidity ranging from 0 percent to 95 percent, and the charge potential preferably ranges from −500 V to +500 V. The modulus of elasticity at 0.5 percent extension of the magnetic layer preferably ranges from 0.98 to 19.6 GPa (100 to 2,000 kg/mm$^2$) in each in-plane direction. The breaking strength preferably ranges from 98 to 686 MPa (10 to 70 kg/mm$^2$). The modulus of elasticity of the magnetic recording medium preferably ranges from 0.98 to 14.7 GPa (100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz) is preferably within a range of 50 to 180° C. for the magnetic layer and 0 to 180° C. for the nonmagnetic layer. The loss elastic modulus preferably falls within a range of $1×10^7$ to $8×10^8$ Pa ($1×10^8$ to $8×10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

From the perspective of reducing spacing, the surface roughness of the magnetic layer, denoted as surface roughness Ra as measured by an atomic force microscope, is desirably equal to or lower than 3.5 nm, preferably equal to or lower than 3.0 nm, and more preferably, equal to or lower than 2.8 nm in the magnetic recording medium of the present invention. From the perspective of ensuring running properties, the lower limit is desirably equal to or higher than 1.0 nm, preferably equal to or higher than 2.0 nm. The magnetic layer surface average roughness Ra can be obtained as a value measured for an area of about a 5 micrometer square (5 μm×5 μm) to about a 100 micrometer square (100 μm×100 μm) of the magnetic layer surface by an atomic force microscope. For example, the Ra can be calculated for a 30 micrometer (30 μm×30 μm) square within a measurement area of 40 micrometers square (40 μm×40 μm).

In the magnetic recording medium of the present invention, physical properties of the nonmagnetic layer and magnetic layer may be varied based on the objective. For example, the modulus of elasticity of the magnetic layer may be increased to improve storage stability while simultaneously employing a lower modulus of elasticity than that of the magnetic layer in the nonmagnetic layer to improve the head contact of the magnetic recording medium.

The head used to reproduce the signal that has been magnetically recorded on the magnetic recording medium of the present invention is not specifically limited. An MR head is desirably employed as the reproduction head to reproduce with high sensitivity a signal that has been high-density recorded. The MR head that is used as the reproduction head is not specifically limited; for example, an AMR head, GMR head, ortmR head can be employed. Of these, a GMR head is desirably employed because it can reproduce with high sensitivity signals that have been high-density recorded. The head that is used for magnetic recording is not specifically limited. The saturation magnetization level of the recording head is desirably equal to or higher than 1.0 T, preferably equal to or higher than 1.5 T, for high-density recording.

Method of Manufacturing Magnetic Recording Medium

The present invention further relates to a method of manufacturing the magnetic recording medium of the present invention.

In the method of manufacturing a magnetic recording medium of the present invention, a magnetic layer is formed with a coating liquid for forming a magnetic layer comprising a ferromagnetic powder, a binder, and a nonmagnetic powder having a coefficient of variation CV of the particle size distribution denoted by the above-described equation (1) of less than 20 percent. To enhance the effect achieved by using a starting material powder having such a sharp particle size distribution, it is desirable to increase the dispersibility of the nonmagnetic powder in the magnetic layer as set forth above. Thus, it is desirable to separately disperse the ferromagnetic powder and nonmagnetic powder. Preferably, either the method of mixing a first liquid (magnetic liquid) containing the ferromagnetic powder, binder, and an organic solvent with a second liquid (desirably the above-described colloidal liquid) containing the above nonmagnetic powder and an organic solvent, or the method of adding a nonmagnetic powder that is dispersible in the organic solvent that is contained in the first liquid to the first liquid is employed. In the former method, the organic solvent contained in the first liquid and the organic solvent contained in the second liquid are desirably compatible. Further, the nonmagnetic powder employed in the former method is desirably capable of uniform dispersion in a primary particle state in the solvent employed in the second liquid. From this perspective, it desirably composed of colloidal particles, as set forth above.

Further, in the method of manufacturing a magnetic recording medium of the present invention, as set forth above, sequential multilayer coating of the nonmagnetic layer and magnetic layer is desirable. As an example of a desirable embodiment of the method of sequential multilayer coating, the nonmagnetic layer coating liquid is coated on a nonmagnetic support to form a coating layer, the coating layer is cured to form a nonmagnetic layer, and the coating liquid for forming a magnetic layer is coated on the nonmagnetic layer that has been formed. As set forth above, radiation curing is desirable from the perspective of productivity. Thus, a radiation-curable resin is desirably employed as the binder used in the coating liquid of the nonmagnetic layer.

The details of the above method of manufacturing a magnetic recording medium of the present invention are as set forth above.

EXAMPLES

The present invention will be described in detail below based on Examples. However, the present invention is not limited to the examples. The "parts" and "percent" given in Examples are weight parts and weight percent unless specifically stated otherwise.

Example 1

Coating Liquid for Forming Magnetic Layer
(Magnetic Liquid)
  Ferromagnetic metal powder: 100 parts
    Co/Fe=40 atomic percent
    HC: 22000 Oe (175 kA/m)
    $S_{BET}$: 75 m$^2$/g
    Surface treatment layers: $Al_2O_3$, $Y_2O_3$
    Average major axis length: 35 nm
    Average acicular ratio: 4
    σs: 110 A·m$^2$/kg (110 emu/g)
  Sulfonic acid group-containing polyurethane resin: 15 parts
  Vinyl chloride copolymer (MR104 made by Zeon Corporation): 10 parts
  Cyclohexanone: 150 parts
  Methyl ethyl ketone: 150 parts
(Abrasive Liquid)
  α-alumina (average primary particle diameter 200 nm, Mohs' hardness 9): 4.5 parts
  Vinyl chloride copolymer (MR110 made by Zeon Corporation): 0.4 part
  Cyclohexanone: 10 parts
(Silica Sol)
  Colloidal silica (average primary particle diameter 0.30 μm, σ=0.020): 1.5 parts
  Methyl ethyl ketone: 3.5 parts
(Other Components)
  Butyl stearate: 1 part
  Stearic acid: 1 part
  Polyisocyanate (Coronate made by Nippon Polyurethane Industry Co., Ltd.): 5.0 parts
(Added Finishing Solvents)
  Cyclohexanone: 180 parts
  Methyl ethyl ketone: 180 parts
  Coating Liquid for Forming Nonmagnetic Layer
  Nonmagnetic inorganic powder (α-iron oxide): 80 parts (particle size: 0.15 μm, average acicular ratio: 7, specific surface area by BET method: 52 m$^2$/g)
  Carbon black (average primary particle diameter 20 nm): 20 parts
  Electron beam-curable vinyl chloride copolymer: 13 parts
  Electron beam-curable polyurethane resin: 6 parts
  Phenyl phosphonic acid: 3 parts
  Cyclohexanone: 140 parts
  Methyl ethyl ketone: 170 parts
  Butyl stearate: 2 parts
  Stearic acid: 1 part
  Coating Liquid for Forming Backcoat Layer
  Nonmagnetic inorganic powder (α-iron oxide): 80 parts (particle size: 0.15 μm, average acicular ratio: 7, specific surface area by BET method: 52 m$^2$/g)
  Carbon black (average primary particle diameter 20 nm): 20 parts
  Carbon black (average primary particle diameter 100 nm): 3 parts
  Vinyl chloride copolymer: 13 parts
  Sulfonic acid group-containing polyurethane resin: 6 parts
  Phenyl phosphonic acid: 3 parts
  Cyclohexanone: 140 parts
  Methyl ethyl ketone: 170 parts
  Stearic acid: 3 parts
  Polyisocyanate: (Coronate made by Nippon Polyurethane Industry Co., Ltd.): 5 parts
  Methyl ethyl ketone: 400 parts The above magnetic liquid was kneaded and diluted in an open kneader. It was then subjected to 12 passes of dispersion processing, each pass having a retention time of 2 minutes, at a bead fill rate of 80 percent and a rotor tip peripheral speed of 10 m/s using zirconia ($ZrO_2$) beads (denoted as "Zr beads" hereinafter) with a particle diameter of 0.5 mm.

The abrasive liquid was prepared as a mixture of alumina: vinyl chloride copolymer (MR110 made by Zeon Corporation):cyclohexanone=90:7:200 (weight ratio), charged to a vertical sand mill disperser with Zr beads 1 mm in diameter, adjusted to 60 percent bead volume/(abrasive liquid volume+ bead volume), and dispersed in the sand mill for 180 minutes. The liquid was removed following dispersion and processed by ultrasonic dispersion filtration with a flow-type ultrasonic dispersion filtration apparatus.

The magnetic liquid, silica sol, abrasive liquid, and other components in the form of lubricants (butyl stearate, stearic acid), a curing agent, and an added finishing solvent were charged to a dissolver stirring apparatus and stirred for 30 minutes at a peripheral speed of 10 m/s. Subsequently, the mixture was processed three times at a flow rate of 7.5 kg/minute with a flow-type ultrasonic disperser and filtered with a 1 micrometer filter to prepare a coating liquid for forming the magnetic layer.

A coating liquid for forming a nonmagnetic layer was prepared by the following method.

Excluding the lubricants (butyl stearate and stearic acid), the above components were kneaded and diluted in an open kneader. The mixture was then subjected to dispersion treatment in a horizontal bead mill disperser. Subsequently, the lubricants (butyl stearate and stearic acid) were added and the mixture was stirred and mixed in a dissolver stirring apparatus to prepare a coating liquid for forming a nonmagnetic layer.

A coating liquid for forming a back coat layer was prepared by the following method.

Excluding the lubricant (stearic acid), polyisocyanate, and methyl ethyl ketone (400 parts), the above components were kneaded and diluted in an open kneader. Subsequently, the mixture was dispersed in a horizontal bead mill disperser. Next, the lubricant (stearic acid), polyisocyanate, and methyl ethyl ketone (400 parts) were added, and the mixture was stirred and mixed in a dissolver stirring apparatus to prepare a coating liquid for forming a back coat layer.

The coating liquid for forming a nonmagnetic layer was coated and dried to a thickness of 1.0 μm on a polyethylene naphthalate support 6 μm in thickness. It was then irradiated with an electron beam at an energy of 40 kGy with an acceleration voltage of 125 kV. The coating liquid for forming a magnetic layer was coated thereover and dried to a thickness of 0.05 μm. The coating liquid for forming a back coat layer was then coated and dried to a thickness of 0.5 μm on the reverse surface of the support.

Subsequently, the surface smoothing treatment was conducted with a calender comprised solely of metal rolls at a rate of 80 m/min, a linear pressure of 300 kg/cm (294 kN/m), and a temperature of 100° C. Next, thermoprocessing was conducted for 36 hours at 70° C. in a dry environment. Following thermoprocessing, the product was slit to a ½ inch width, the slit product was fed out, and the surface of the magnetic layer was cleaned with a cleaning device equipped with a winding device such that nonwoven cloth and a razor blade were pressed against the magnetic surface, yielding a sample tape.

Example 2

With the exceptions that the quantity of colloidal silica added to the silica sol was changed to 3.5 parts and the quantity of methyl ethyl ketone added was changed to 8.2 parts, a sample tape was prepared by the same method as in Example 1.

Example 3

With the exceptions that the colloidal silica with an average particle diameter of 0.30 μm was changed to colloidal silica with an average particle diameter of 0.20 μm and σ=0.011 in the silica sol, a sample tape was prepared by the same method as in Example 1.

Example 4

With the exceptions that the quantity of colloidal silica added to the silica sol was changed to 3.5 parts and the quantity of methyl ethyl ketone added was changed to 8.2 parts, a sample tape was prepared by the same method as in Example 3.

Example 5

With the exceptions that the colloidal silica with an average particle diameter of 0.30 μm was changed to colloidal silica (MEK-ST-ZL from Nissan Chemical Industries, Ltd.) with an average particle diameter of 0.10 μm and σ=0.0052 in the silica sol, a sample tape was prepared by the same method as in Example 1.

Example 6

With the exceptions that the quantity of colloidal silica added was changed to 3.5 parts and the quantity of methyl ethyl ketone added was changed to 8.2 parts in the silica sol, a sample tape was prepared by the same method as in Example 5.

Example 7

With the exception that 1.5 parts of a silica powder with an average particle diameter of 0.20 μm and σ=0.011 (Sifoster KE-P20 made by Nippon Shokubai Co., Ltd.) were added in the preparation of the coating liquid for forming the magnetic layer, a sample tape was prepared by the same method as in Example 4.

Example 8

With the exceptions that the quantity of colloidal silica added was changed to 0.9 parts and the quantity of methyl ethyl ketone added was changed to 2.1 parts in the silica sol, a sample tape was prepared by the same method as in Example 4.

Example 9

With the exception that the coating liquid for forming the magnetic layer was coated to a magnetic layer dry thickness of 0.10 μm, a sample tape was prepared by the same method as in Example 4.

Example 10

The electron beam-curable vinyl chloride copolymer in the coating liquid for forming the nonmagnetic layer was changed to a sulfonic acid group-containing vinyl chloride copolymer, the electron beam-curable polyurethane resin was changed to a sulfonic acid group-containing polyurethane resin, and five parts of polyisocyanate (Coronate made by Nippon Polyurethane Industry Co., Ltd.) were added to prepare a coating liquid for forming a nonmagnetic layer.

The coating liquid for forming a nonmagnetic layer was coated and dried to a thickness of 1.0 μm. Subsequently, the coating liquid for forming a backcoat layer was coated and dried to a thickness of 0.5 μm on the opposite surface of the support. The wound up support was thermoprocessed for 36 hours in a 70° C. dry environment. The coating liquid for forming a magnetic layer was coated and dried to a thickness of 0.05 μm on the nonmagnetic layer following thermoprocessing. With these exceptions, a sample tape was prepared by the same method as in Example 4.

Example 11

The coating liquid for forming the nonmagnetic layer was coated and dried to a thickness of 1.0 μm, after which the coating liquid for forming the magnetic layer was coated thereover and dried to a thickness of 0.05 μm. The coating liquid for forming a backcoat layer was then coated and dried to a thickness of 0.5 μm on the opposite surface of the support. With these exceptions, a sample tape was prepared by the same method as in Example 10.

Example 12

With the exception that the components of the coating liquid for forming the magnetic layer were changed as set forth below, a sample tape was prepared by the same method as in Example 1.
(Magnetic Liquid)
  Barium ferrite magnetic powder: 100 parts
    (Hc: 2,100 Oe (168 kA/m), average particle size: 25 nm)
  Sulfonic acid group-containing polyurethane resin: 15 parts
  Cyclohexanone: 150 parts
  Methyl ethyl ketone: 150 parts
(Abrasive Liquid)
  α-alumina (average primary particle diameter 110 nm, Mohs' hardness 9): 9.0 parts
  Vinyl chloride copolymer (MR110 made by Zeon Corporation): 0.7 parts
  Cyclohexanone: 20 parts
(Silica Sol)
  The silica sol employed in Example 4
(Other Components)
  Butyl stearate: 1 part
  Stearic acid: 1 part
  Polyisocyanate (Coronate made by Nippon Polyurethane Industry Co., Ltd): 2.5 parts
(Added Finishing Solvents)
  Cyclohexanone: 180 parts
  Methyl ethyl ketone: 180 parts Comparative Example 1

With the exception that the colloidal silica was replaced with a carbon black liquid (average particle diameter of carbon black 0.20 μm, σ=0.21, 0.25 part of carbon black and 1 part of cyclohexanone added per 100 parts of ferromagnetic metal powder), a sample tape was prepared by the same method as in Example 1. The carbon black liquid was liquefied for 30 minutes at a stirring rotational speed of 1,500 rpm in a batch-type ultrasonic dispersion device equipped with stirrer. The liquefied carbon black liquid was then subjected to 6 passes of dispersion processing, each pass having a retention time of 2 minutes, at a bead fill rate of 80 percent and a rotor tip peripheral speed of 10 m/s using Zr beads 0.5 mm in diameter in a horizontal bead mill disperser. The liquid was mixed for 30 minutes at a peripheral speed of 10 m/s in a dissolver stirring apparatus and then subjected to 3 passes of processing at a flow rate of 3 kg/min in a flow-type ultrasonic disperser.

Comparative Example 2

With the exception that the coating liquid for forming the magnetic layer was coated to yield a dry magnetic layer thickness of 0.2 μm, a sample tape was prepared by the same method as in Example 4.

Comparative Example 3

With the exception that 3.5 parts of silica powder with an average particle diameter of 0.50 μm and σ=0.020 were added, a sample tape was prepared by the same method as in Example 7.

Comparative Example 4

With the exception that the coating liquid for forming the magnetic layer was coated to yield a dry magnetic layer thickness of 0.2 μm, a sample tape was prepared by the same method as in Comparative Example 3.

Comparative Example 5

With the exception that the colloidal silica in the silica sol was changed to colloidal silica with an average particle diameter of 0.20 μm and σ=0.053, a sample tape was prepared by the same method as in Example 4.

Comparative Example 6

With the exceptions that the silica sol employed contained 0.5 parts of colloidal silica with an average particle diameter of 0.04 μm and σ=0.01, and 1.2 parts of methyl ethyl ketone, and that the coating liquid for forming the magnetic layer was coated to a dry magnetic layer thickness of 0.3 μm, a sample tape was prepared by the same method as in Example 4.

Comparative Example 7

With the exceptions that 2.5 parts of spherical silica powder with an average particle diameter of 0.25 μm and σ=0.057 were added and the coating liquid for forming the magnetic layer was coated to yield a dry magnetic layer thickness of 0.2 μm, a sample tape was prepared by the same method as in Example 7.

Comparative Example 8

With the exception that no silica sol was added, a sample tape was prepared by the same method as in Example 1.

Those of the silica sols and silica powders employed in the above-described Examples and Comparative Examples for which product names have been indicated were obtained as commercial products. The others were obtained by known methods. The fact that the silica particles were stably dispersed in colloidal form was visually confirmed in the silica sols. A visual determination of the dispersibility of the silica powder employed in Example 7 when added to the organic solvents in the form of cyclohexanone and methyl ethyl ketone that were used in the coating liquid for forming the magnetic layer revealed no coarse aggregate or precipitate. Based on these results, the silica powder employed in Example 7 was determined to be dispersible in these solvents.

Evaluation Methods

1. Evaluation of Electromagnetic Characteristics

The S/N ratio was measured with a ½ inch reel tester on which a head was secured. The relative head/tape speed was 4 m/s.

Recording was conducted with an MIG head (gap length 0.15 μm, track width 3.0 μm). The recording current was set to the optimal recording current of each tape.

A GMR head with an element thickness of 15 nm, a shield spacing of 0.1 μm, and a read width of 1.0 μm was employed as the reproduction head.

A signal with a linear recording density of (200 KFci) was recorded, and the reproduced signal was measured with a spectrum analyzer made by ShibaSoku Co., Ltd. The ratio of the output of the carrier signal to the noise integrated over the entire spectral band was adopted as the S/N ratio. The S/N ratio obtained was evaluated on the following scale.

The S/N ratio of Comparative Example 1 was adopted as 0 dB.

| | |
|---|---|
| S/N ratio of equal to or greater than +0 dB | ⊚ |
| S/N ratio of equal to or greater than −0.5 dB but less than +0 dB | ○ |
| S/N ratio equal to or less than −0.5 dB | X |

2. Evaluation of Frictional Characteristics (Sliding Properties)

The tape was lapped at 180° on a round rod of AlTiC that was 4 mm in diameter and had a Ra of 15 nm as measured for a 40 micrometer square by AFM. A 100 g load was applied, and the tape was slid 45 mm at a rate of 14 mm/s. The loads during sliding at equal speed at pass 1 and at pass 100 were detected with a load cell. The coefficient of friction was calculated from the following equation:

$$\text{Coefficient of friction} = \ln(\text{measured value (g)}/100 \text{ (g)})/\pi$$

The coefficient of friction at pass 1 and at pass 100 was evaluated according to the following scale.

| | |
|---|---|
| Less than 0.3 | ⊚ |
| Less than 0.4 | ○ |
| Less than 0.5 | Δ |
| Equal to or greater than 0.5 | X |

3. Evaluation of the Average Particle Diameter, Maximum Particle Diameter, Standard Deviation σ, and Sphericity (Average Degree of Circularity) of the Nonmagnetic Powder of the Magnetic Layer The above starting material powder was coated as a film, and dried, for the powder dispersed in the solvent. Fifty particles each were traced with a digitizer in 50,000-fold (colloidal silica with average particle diameters of 0.30 μm and 0.20 μm; silica powders with average particle diameters of 0.50 μm, 0.25 μm, and 0.20 μm; carbon with an average particle diameter of 0.20 μm) and 100,000-fold (colloidal silica with an average particle diameter of 0.10 μm and 0.04 μm) SEM images. The diameters of circles having the same areas (diameters corresponding to circular areas) as the regions traced for the individual particles were made the diameters of the individual particles. The particle diameters thus obtained were averaged (arithmetic average) for the 50 particles to obtain the average particle diameter. The standard deviation σ and the maximum particle diameter were obtained from the particle diameter obtained. The degree of circularity of each particle was calculated using the equation set forth above for the 50 particles that were traced. The degrees of circularity calculated in this manner were averaged (arithmetic average) for the 50 particles to obtain the average degree of circularity.

4. Measurement of the Number of Protrusions on the Surface of the Magnetic Layer A region 40 μm×40 μm of the tape surface was measured by AFM (a Nanoscope 4 from Veeco). The scan rate (probe displacement rate) was 40 μm/sec. and the resolution was 512×512 pixels. The numbers of protrusions with heights that were equal to or higher than 15 nm, equal to or higher than 20 nm, and equal to or higher than 25 nm above the reference surface were determined in a 30 μm×30 μm region within this region, excluding marking portions used for observing the same region.

TABLE 1

|  | Ferromagnetic powder | Method of forming non-magnetic layer(at the time when coating a magnetic layer coating liquid) | Magnetic layer thickness t(μm) | Nonmagnetic filler in the magnetic layer | |
|---|---|---|---|---|---|
|  |  |  |  | Type | Quantity added (weight part) |
| Ex. 1 | MP[Note 1)] | Curing with electron beam | 0.05 | Colloidal silica | 1.5 |
| Ex. 2 | MP | Curing with electron beam | 0.05 | Colloidal silica | 3.5 |
| Ex. 3 | MP | Curing with electron beam | 0.05 | Colloidal silica | 1.5 |
| Ex. 4 | MP | Curing with electron beam | 0.05 | Colloidal silica | 3.5 |
| Ex. 5 | MP | Curing with electron beam | 0.05 | Colloidal silica | 1.5 |
| Ex. 6 | MP | Curing with electron beam | 0.05 | Colloidal silica | 3.5 |
| Ex. 7 | MP | Curing with electron beam | 0.05 | Silica powder | 1.5 |
| Ex. 8 | MP | Curing with electron beam | 0.05 | Colloidal silica | 0.90 |
| Ex. 9 | MP | Curing with electron beam | 0.10 | Colloidal silica | 3.5 |
| Ex. 10 | MP | Thermosetting | 0.05 | Colloidal silica | 3.5 |
| Ex. 11 | MP | Not cured | 0.05 | Colloidal silica | 3.5 |
| Ex. 12 | BaFe[Note 2)] | Curing with electron beam | 0.05 | Colloidal silica | 3.5 |
| Comp. Ex. 1 | MP | Curing with electron beam | 0.05 | Carbon black | 0.25 |
| Comp. Ex. 2 | MP | Curing with electron beam | 0.20 | Colloidal silica | 3.5 |
| Comp. Ex. 3 | MP | Curing with electron beam | 0.05 | Silica powder | 3.5 |
| Comp. Ex. 4 | MP | Curing with electron beam | 0.20 | Silica powder | 3.5 |
| Comp. Ex. 5 | MP | Curing with electron beam | 0.05 | Colloidal silica | 3.5 |
| Comp. Ex. 6 | MP | Curing with electron beam | 0.30 | Colloidal silica | 0.5 |
| Comp. Ex. 7 | MP | Curing with electron beam | 0.20 | Silica powder | 2.5 |
| Comp. Ex. 8 | MP | Curing with electron beam | 0.05 | None | None |

|  | Nonmagnetic filler in the magnetic layer | | | | | |
|---|---|---|---|---|---|---|
|  | Average particle diameter φ (μm) | φ/t | Standard deviation σ | Coefficient of variation σ/φ | Maximum particle diameter | Average degree of circularity |
| Ex. 1 | 0.30 | 6.0 | 0.020 | 6.7% | φ + 1.5σ | 0.88 |
| Ex. 2 | 0.30 | 6.0 | 0.020 | 6.7% | φ + 1.5σ | 0.88 |
| Ex. 3 | 0.20 | 4.0 | 0.011 | 5.5% | φ + 2.7σ | 0.87 |
| Ex. 4 | 0.20 | 4.0 | 0.011 | 5.5% | φ + 2.7σ | 0.87 |
| Ex. 5 | 0.10 | 2.0 | 0.0052 | 5.2% | φ + 3.8σ | 0.88 |
| Ex. 6 | 0.10 | 2.0 | 0.0052 | 5.2% | φ + 3.8σ | 0.88 |
| Ex. 7 | 0.20 | 4.0 | 0.011 | 5.5% | φ + 3.6σ | 0.87 |
| Ex. 8 | 0.20 | 4.0 | 0.011 | 5.5% | φ + 2.7σ | 0.87 |
| Ex. 9 | 0.20 | 2.0 | 0.011 | 5.5% | φ + 2.7σ | 0.87 |
| Ex. 10 | 0.20 | 4.0 | 0.011 | 5.5% | φ + 2.7σ | 0.87 |
| Ex. 11 | 0.20 | 4.0 | 0.011 | 5.5% | φ + 2.7σ | 0.87 |
| Ex. 12 | 0.20 | 4.0 | 0.011 | 5.5% | φ + 2.7σ | 0.87 |
| Comp. Ex. 1 | 0.20 | 4.0 | 0.21 | 105% | φ + 2.2σ | 0.67 |
| Comp. Ex. 2 | 0.20 | 1.0 | 0.011 | 5.5% | φ + 2.7σ | 0.87 |
| Comp. Ex. 3 | 0.50 | 10.0 | 0.020 | 4.0% | φ + 2.0σ | 0.88 |
| Comp. Ex. 4 | 0.50 | 2.5 | 0.020 | 4.0% | φ + 2.0σ | 0.88 |
| Comp. Ex. 5 | 0.20 | 4.0 | 0.053 | 27% | φ + 1.5σ | 0.86 |
| Comp. Ex. 6 | 0.04 | 0.1 | 0.010 | 25% | φ + 8σ | 0.84 |
| Comp. Ex. 7 | 0.25 | 1.3 | 0.057 | 23% | φ + 1.6σ | 0.86 |
| Comp. Ex. 8 | — | — | — | — | — | — |

[Note 1)]MP: Ferromagnetic powder
[Note 2)]BaFe: Barium ferrite powder
[Note 3)]Measurement was impossible because it was difficult for the tape to run due to high coefficient of friction.

|  | Surface protrusions on the magnetic layer | | | | | | |
|---|---|---|---|---|---|---|---|
|  | Number of AFM protrusions | | | Ratio of density of protrusions | Evaluation results | | |
|  | 15 nm or higher in height | 20 nm or higher in height | 25 nm or higher in height | 25 nm or higher in height/15 nm or higher in height | μ value | | Electromagnetic characteristics |
|  |  |  |  |  | 1P | 100P |  |
| Ex. 1 | 160 | 49 | 9 | 0.056 | 0.23 ⊚ | 0.19 ⊚ | ○ |
| Ex. 2 | 239 | 78 | 15 | 0.663 | 0.23 ⊚ | 0.19 ⊚ | △ |
| Ex. 3 | 116 | 7 | 1 | 0.0086 | 0.38 ○ | 0.31 ○ | ⊚ |
| Ex. 4 | 146 | 11 | 3 | 0.021 | 0.31 ○ | 0.23 ⊚ | ⊚ |
| Ex. 5 | 70 | 5 | 2 | 0.029 | 0.35 ○ | 0.25 ⊚ | ⊚ |
| Ex. 6 | 100 | 6 | 2 | 0.020 | 0.35 ○ | 0.25 ⊚ | ⊚ |
| Ex. 7 | 141 | 18 | 4 | 0.028 | 0.23 ⊚ | 0.20 ⊚ | ○ |
| Ex. 8 | 50 | 1 | 1 | 0.020 | 0.47 △ | 0.44 △ | ⊚ |
| Ex. 9 | 98 | 5 | 1 | 0.010 | 0.34 ○ | 0.23 ⊚ | ⊚ |
| Ex. 10 | 172 | 22 | 6 | 0.035 | 0.26 ⊚ | 0.24 ⊚ | ○ |
| Ex. 11 | 92 | 23 | 8 | 0.087 | 0.32 ○ | 0.25 ⊚ | △ |
| Ex. 12 | 150 | 20 | 5 | 0.033 | 0.28 ⊚ | 0.20 ⊚ | ○ |
| Comp. Ex. 1 | 62 | 28 | 15 | 0.24 | 0.40 △ | 0.50 X | △ |
| Comp. Ex. 2 | 30 | 4 | 0 | 0 | 0.60 X | 0.48 △ | Measurement was impossible.[Note 3] |
| Comp. Ex. 3 | 240 | 93 | 30 | 0.13 | 0.25 ⊚ | 0.20 ⊚ | X |
| Comp. Ex. 4 | 238 | 79 | 8 | 0.034 | 0.35 ○ | 0.30 ○ | X |
| Comp. Ex. 5 | 147 | 78 | 20 | 0.14 | 0.30 ○ | 0.22 ⊚ | X |
| Comp. Ex. 6 | 25 | 5 | 0 | 0 | 0.66 X | 0.50 X | Measurement was impossible.[Note 3] |
| Comp. Ex. 7 | 130 | 75 | 20 | 0.15 | 0.30 ○ | 0.23 ⊚ | X |
| Comp. Ex. 8 | 31 | 5 | 2 | 0.065 | 0.57 X | 0.47 △ | Measurement was impossible[Note 3] |

Evaluation Results

Magnetic tapes with both frictional characteristic and electromagnetic characteristic evaluations of "X" did not exhibit adequate practical performance. As indicated in Table 1, the magnetic tapes of Examples 1 to 12 had frictional characteristic and electromagnetic characteristic evaluation results of "△" or better. They were thus found to have both good frictional characteristics and electromagnetic characteristics.

By contrast, Comparative Example 1, in which the coefficient of variation of the particle size distribution exceeded 20 percent, did not attain both good frictional characteristics and electromagnetic characteristics. This was attributed to a large particle size distribution resulting in a small number of particles that effectively enhanced frictional characteristics and the occurrence of a spacing loss due to coarse particles considerably removed from the average particle diameter.

In Comparative Examples 2 and 6, measurement of electromagnetic characteristics was precluded by marked deterioration of frictional characteristics. Since the ϕ/t value was less than 1.1, the presence of protrusions that effectively enhanced frictional characteristics on the surface of the magnetic layer was thought to have been precluded. In Comparative Example 8, the frictional characteristics also deteriorated markedly, making it impossible to measure the electromagnetic characteristics. This was attributed to the fact that no nonmagnetic filler contributing to enhancing frictional characteristics was incorporated.

Additionally, Comparative Examples 3 to 5 and 7 exhibited good frictional characteristics but poor electromagnetic characteristics. In Comparative Example 3, this was thought to have been caused by a value of ϕ/t that greatly exceeded 8.0 due to the presence of a large number of coarse protrusions that became spacing factors on the surface of the magnetic layer. In Comparative Example 4, it was attributed to the thickness of the magnetic layer exceeding 0.1 μm. In Comparative Example 5, the coefficient of variation was greater than 20 percent, indicating the presence of a large number of particles considerably removed from the average particle diameter that became spacing factors and were presumed to have caused deterioration of electromagnetic characteristics. In Comparative Example 7, the fact that the thickness of the magnetic layer exceeded 0.1 μm and the fact that the coefficient of variation of the particle size distribution exceeded 20 percent were presumed to have diminished electromagnetic characteristics due to spacing loss caused by particles that were considerably removed from the average particle diameter.

The above results demonstrate that both frictional characteristics and electromagnetic characteristics were achieved by adding a nonmagnetic filler, having a sharp particle size distribution with a CV value of less than 20 percent, in which the relation of the magnetic layer thickness t to the average particle diameter ϕ satisfied $1.1 \leq \phi/t \leq 8.0$, to a thin magnetic layer with a thickness of equal to or less than 0.1 μm.

The magnetic recording medium of the present invention is suitable as a computer backup tape of which greater density is demanded.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium comprising a nonmagnetic layer containing a nonmagnetic powder and a binder and a magnetic layer containing a ferromagnetic powder and a binder in this order on a nonmagnetic support, wherein
the magnetic layer comprises a nonmagnetic powder of which coefficient of variation CV of a particle size distribution as denoted by the following formula (1):

$$CV(\%) = \sigma/\phi \times 100 \qquad (1)$$

is less than 20 percent,
the nonmagnetic powder contained in the magnetic layer is silica powder,
the magnetic layer further comprises an inorganic powder other than the silica powder, with a Mohs' hardness of equal to or higher than 6,
the magnetic layer contains no carbon black, and
the magnetic layer has a thickness being equal to or less than 0.1 μm and falling within a range of $1.1 \leq \phi/t \leq 8.0$, wherein σ denotes the standard deviation of the particle diameter, φ denotes the average particle diameter of the nonmagnetic powder comprised in the magnetic layer expressed in μm, and t denotes the thickness of the magnetic layer expressed in μm.

2. The magnetic recording medium according to claim 1, wherein the silica powder comprised in the magnetic layer is composed of silica colloidal particles.

3. The magnetic recording medium according to claim 1, wherein
the average particle diameter φ of the nonmagnetic powder comprised in the magnetic layer ranges from 0.10 to 0.20 μm, and
the magnetic layer comprises the nonmagnetic powder in a quantity ranging from 1.5 to 3.5 weight parts, per 100 weight parts of the ferromagnetic powder.

4. The magnetic recording medium according to claim 1, wherein the density of protrusions on the surface of the magnetic layer, as measured by an atomic force microscope, satisfies the following equation (3):

Density of protrusions equal to or higher than 25 nm in height/density of protrusions equal to or higher than 15 nm in height <0.1 (3).

5. The magnetic recording medium according to claim 1, wherein the maximum particle diameter of the nonmagnetic powder comprised in the magnetic layer satisfies the following equation (2):

Maximum particle diameter being expressed in
μm<φ+10σ      (2).

6. The magnetic recording medium according to claim 1, wherein the average degree of circularity of the nonmagnetic powder comprised in the magnetic layer is greater than 0.8 but equal to or less than 1.0.

7. The magnetic recording medium according to claim 1, wherein the nonmagnetic layer is a radiation-cured layer.

8. A method of manufacturing a magnetic recording medium, wherein
the magnetic recording medium is the magnetic recording medium according to claim 1, and
the method comprises forming a magnetic layer with a magnetic layer coating liquid comprising a ferromagnetic powder, a binder, and a nonmagnetic powder of which coefficient of variation CV of a particle size distribution as denoted by the following formula (1) is less than 20 percent:

$$CV(\%) = \sigma/\phi \times 100 \qquad (1)$$

wherein σ denotes a standard deviation of a particle diameter, and φ denotes an average particle diameter of the nonmagnetic powder comprised in the magnetic layer coating liquid being expressed in μm.

9. The method of manufacturing a magnetic recording medium according to claim 8, which comprises preparing the magnetic layer coating liquid by mixing a first liquid comprising a ferromagnetic powder, a binder, and an organic solvent with a second liquid comprising the nonmagnetic powder and an organic solvent.

10. The method of manufacturing a magnetic recording medium according to claim 9, wherein the second liquid is a colloidal liquid.

11. The method of manufacturing a magnetic recording medium according to claim 10, wherein the colloidal liquid is a silica sol.

12. The method of manufacturing a magnetic recording medium according to claim 9, wherein the organic solvent comprised in the first liquid has a compatibility with the organic solvent comprised in the second liquid.

13. The method of manufacturing a magnetic recording medium according to claim 12, wherein the organic solvent comprised in the first liquid and the organic solvent comprised in the second liquid are respectively selected from the group consisting of methyl ethyl ketone, cyclohexanone, and mixed solvents thereof.

14. The method of manufacturing a magnetic recording medium according to claim 8, which comprises preparing the magnetic layer coating liquid by adding the nonmagnetic powder to a first liquid comprising a ferromagnetic powder, a binder, and an organic solvent.

15. The method of manufacturing a magnetic recording medium according to claim 14, wherein the nonmagnetic powder is dispersible in the organic solvent comprised in the first liquid.

16. The method of manufacturing a magnetic recording medium according to claim 8, which comprises:
coating a nonmagnetic layer coating liquid comprising a nonmagnetic powder and a binder on a nonmagnetic support to form a coating layer;
subjecting the coating layer to a curing treatment to form a nonmagnetic layer; and then
coating the magnetic layer coating liquid on the nonmagnetic layer formed.

17. The method of manufacturing a magnetic recording medium according to claim 16, wherein the binder comprised in the nonmagnetic layer coating liquid comprises a radiation-curable resin.

* * * * *